United States Patent

[11] 3,587,056

[72] Inventors Walter Banziger
Utica;
Donald C. Smith, Mohawk, both of, N.Y.
[21] Appl. No. 812,126
[22] Filed Apr. 1, 1969
[45] Patented June 22, 1971
[73] Assignee Mohawk Data Sciences Corporation
Herkimer, N.Y.

[54] PROGRAM LOAD SYSTEM FOR A DATA RECORDER

9 Claims, 7 Drawing Figs.

[52] U.S. Cl. .......... 340/172.5
[51] Int. Cl. .......... G06f 7/00, G11b 13/00
[50] Field of Search .......... 235/157; 340/172.5

[56] References Cited
UNITED STATES PATENTS
3,360,781 12/1967 Boehnke .......... 340/172.5
3,483,523 12/1969 Cogar et al. .......... 340/172.5

*Primary Examiner*—Paul J. Henon
*Assistant Examiner*—Melvin B. Chapnick
*Attorneys*—Richard H. Smith, Francis J. Thomas, Thomas C. Siekman and Sughrue, Rothwell, Mion, Zinn and Macpeak

ABSTRACT: A keyboard-to-tape data recorder with a magnetic core memory to buffer data in the key-to-tape transfer cycle. The memory is provided with a section for storing working data to be recorded and a section for storing program control data which enables the recorder to automatically execute subroutines such as duplicate, skip, etc. The memory loading cycle operates to inhibit keyboard access to the program memory section during normal data entry cycles but permits program data to be added, deleted or changed via the keyboard upon actuation of a special control switch. The program entry cycle enables single-keystroke entry of program data and insures that program data fields adjacent to those being altered are not disturbed.

PRIOR ART

INVENTORS
WALTER BANZIGER
DONALD C. SMITH
BY, Richard H. Smith
ATTORNEY

PROGRAM LOAD SYSTEM FOR A DATA RECORDER

BACKGROUND OF THE INVENTION

This invention relates to data recorders and, more particularly, to data recorders of the type employing stored programs for partially controlling the function of the recorder under selected conditions.

Until 1965 the vast majority of computer users had no way of rapidly preparing source data for computer processing. Virtually the only means available to medium and small size computer users for placing source data into computer processable form was the punched card. Data from source documents had to be recorded on punched cards in a special punched card code format by operators using keypunch machines, such as the familiar IBM Model 026. The cards then had to be collected and processed by a special card reading machine, at a maximum rate of approximately 2,000 cards per minute, to convert the punched data from the punched card code to a computer readable code. The output from the card reader was fed either to a magnetic tape recorder or directly to the internal memory of the computer.

In many applications the punched cards had no further use once the data was recorded on magnetic tape or placed in the computer and the cards would simply be disposed of. The delays and costs inherent in processing, storing and disposing of the cards were a considerable drawback to many computer users, especially those having large amounts of data to process.

Introduction of the keyboard-to-tape data recorder by the Mohawk Data Sciences Corporation (MDS) in 1965 eliminated many of the bottlenecks previously experienced in processing computer input data. The MDS-type data recorder enables a "keypunch" operator to place source data directly on magnetic tape in computer-readable form. The machine thus eliminates the need for punched cards and punched card handling equipment in a large number of computer input-generating applications. Keyboard-to-tape data recorders have become standard equipment in many if not most data processing installations.

In MDS-type data recorders data is entered from a keyboard into a magnetic core buffer memory and then, after certain data checks are performed, the data is rapidly transferred from the buffer memory to magnetic tape. To enable the recorder to perform all the data entry functions previously performable on keypunch machines, a portion of the buffer memory is allocated for storage of program data. Each storage location in the buffer memory includes a section for storing working data and a section for storing program data. The stored program data enables automatic performance of certain control functions such as identification of predetermined data fields, automatic duplication of all or part of a previous record during data entry, automatic skipping of data fields or parts of data fields during data verification, automatic checking during verify, etc.

The MDS-type data recorder operates on a basic data entry cycle which includes provision for entry of program data into the program section of the memory from the keyboard. However, due to the nature of the basic data entry cycle which has been used in the machine, operators are required to execute two entry cycles to put a character into the program memory. This is because the basic data entry cycle requires the program data to be first entered into the working data section of the memory in a first entry cycle whereupon it must subsequently be shifted from the working data section to the program data section in a second entry cycle. Furthermore, the basic entry cycle is such that it necessitates the exercise of special precaution to insure that the entry of new program data in one field does not disturb old program data in a following data field.

Objects and Summary of the Invention

It is an object of the invention to provide an improved program data loading feature for an MDS-type data recorder.

A further object is to provide a program data loading system for an MDS-type data recorder wherein program data is loaded in a single data entry cycle.

Another object is to provide a program data loading system for an MDS-type data recorder wherein the loading of program data in a first data field can in no way disturb the program data in any other data field.

A characteristic data entry cycle in an MDS-type data recorder begins with the depression of a data key. This causes a data character to be transmitted from the keyboard to an input-output register called the B register. Termination of the key depression initiates a fixed clock cycle which automatically controls the execution of the rest of the entry cycle.

The basic cycle consists of two parts of subcycles. In the first subcycle the working data contents of a selected storage location in the memory together with the corresponding program data are transferred to a transfer register called the A register. Next, the contents of the B register are transferred to the just-emptied section in the working memory and the program data in the A register is returned to its previous location in the program section. At the end of the first subcycle the memory addressing circuits are stepped to the next succeeding memory location and during the second subcycle the working and program data of the newly addressed location is transferred to the A register and thereafter is transferred back to the same location in memory. The purpose of this latter transfer in and out of the A register is to enable the control circuits of the recorder to inspect the contents of the next succeeding storage location to see if any automatic subroutines, e.g., dup, skip, etc., are called for or to see if the end of the data field has been reached.

In accordance with the present invention, single cycle program data entry is achieved with a minimum disruption of the normal data entry pattern by the provision of data transfer means operable during the first subcycle of a program entry cycle to transfer the keyboard-entered contents of the B register directly to the A register at the time the same data is being entered into the working memory. Thereafter, still during the first subcycle, the contents of the A register are transferred to the program memory with the result that in the program entry cycle the keyboard-entered program data is stored during the first subcycle in both the working and program data sections of the same storage location. The second subcycle of the program entry cycle, in accordance with the invention, is rendered identical to the second subcycle of a normal working data entry cycle so that the new data is not entered into the program memory. This prevents any disruption of the program data in an adjacent data field which may not be undergoing alteration.

These and other objects, features and advantages will be made apparent by the following detailed description of a preferred embodiment of the invention, the description being supplemented by drawings as follows:

DETAILED DESCRIPTION

Figure 1A:
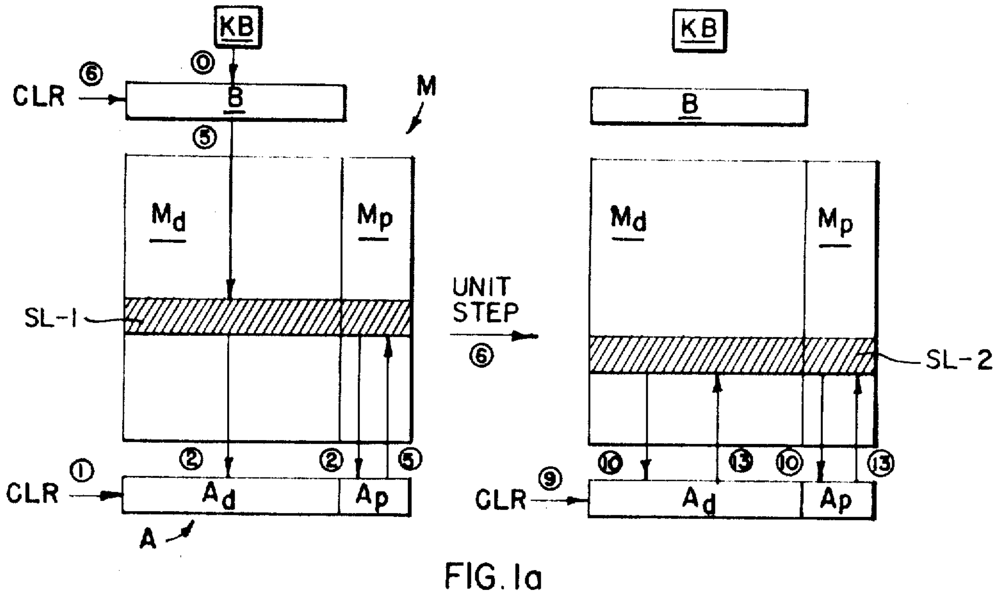
FIG. 1a PRIOR ART
FIG. 1 is a schematic diagram illustrating the execution, in accordance with the prior art, of a basic working data entry cycle (FIG. 1*a*) and a program data entry cycle (FIG. 1*b*).

The basic data entry cycle for entering working data into the buffer memory of the prior art MDS-type data recorder is diagrammatically illustrated in FIG. 1*a*. The buffer memory M is divided into two sections, a section $M_d$ for storing working data and a section $M_p$ for storing program data. The B register is shown as a block B and the A register is shown as a block A divided into two sections, section $A_d$ for storing working data and Section $A_p$ for storing program data. Each arrow in the drawing depicts a step in the data entry cycle and is accompanied by a number in a circle indicating the time during the cycle when the step takes place. As will be understood subsequently, the circled numbers relate to specific clock pulses in a 16 pulse clock cycle.

As shown in FIG. 1*a*, the first event in the prior art data entry cycle is the transfer of a data character from the keyboard KB to the B register. This event is indicated as taking place at "0" time since it actually occurs before the beginning of the clock cycle. After the data has been placed in the B register, the A register is cleared (by a signal CLR) and then the working and program contents of the addressed storage location (indicated by crosshatching and the letters SL–1) are transferred to the working $A_d$ and program $A_p$ sections, respectively, of the A register. Three time units later the program data is transferred back to its previous position in the program storing section $M_p$ of memory M and concurrently the data in the B register is entered into the just-emptied location SL–1 of the working data section $M_d$. Following that, the B register is cleared (by a signal CLR) and the memory addressing circuits step to the next succeeding storage location SL–2 in the memory M. The latter event is called a "unit step". This terminates the first subcycle of the data entry cycle.

The second data entry subcycle begins at "9" time with the clearing of the A register. Next, the working and program contents of the newly addressed storage location SL–2 are transferred to the A register. Three time units later this data is transferred back to its previous position in memory M. The purpose for this transfer in and out of the A register during the second subcycle is to permit the control circuits to inspect the A register to determine whether or not to initiate an automatic sequence. If no automatic sequence is initiated the data recorder waits at the end of the second subcycle for the next key depression or other manually initiated operation. Depression of another data key in keyboard KB initiates another data entry cycle with the result that new data is entered into the working data section $M_d$ of the storage location SL–2 which was addressed during the second subcycle of the previous entry cycle as just described.

Figure 1B:
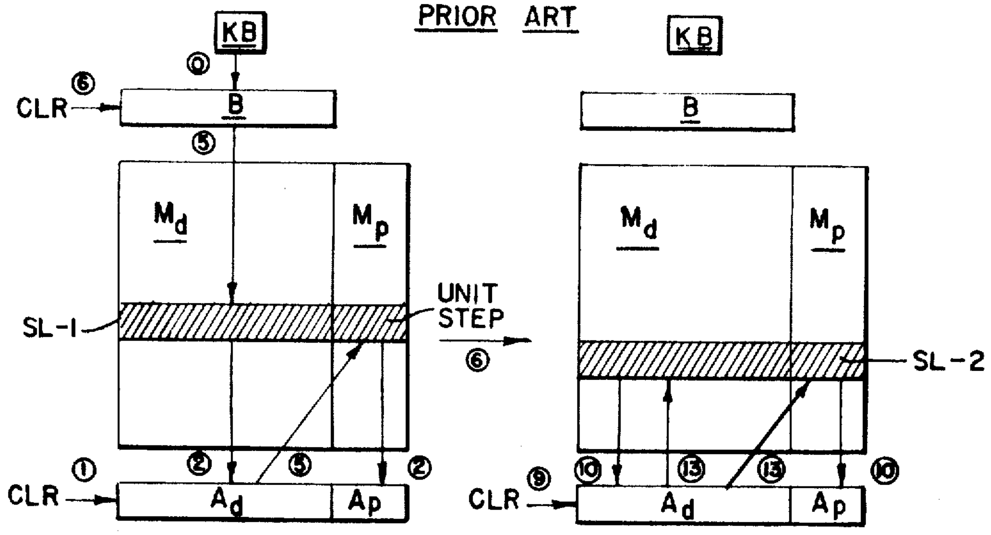

It can be seen from the above that during a normal working data entry cycle no new data is placed in the program section $M_p$ of the memory M. The keyboard operator normally is not concerned with the contents thereof and does not delete data therefrom or add new data thereto. When it is necessary to alter the contents of the program memory $M_p$ the operator must actuate a special program load switch on the control panel of the machine before entering the new program data through the keyboard. A program entry cycle as performed by the prior art machine is depicted in FIG. 1*b*. As in the normal entry cycle, the first thing that happens is that the data from keyboard KB data, in this instance program data, is entered into the B register. This initiates the automatic clocking cycle and, as in the normal data cycle, the A register is cleared at "1" time and the contents of the memory M at storage location SL–1 are transferred to the A register at "2" time. However, at the time the contents of the B register are entered into memory M, the return of the program data back to memory M is inhibited and instead the data from the working data section $A_d$ of the A register is transferred to the program memory $M_p$. Actually, as will be explained subsequently, only a portion of the contents of the $A_d$ section of the A register is transferred to the program memory $M_p$ since a program character includes only four bits of data while a working character includes eight bits.

After the data has been entered into memory M, the B register is cleared and a unit step is performed, terminating the first subcycle. During the second subcycle of the program entry cycle the A register is cleared and the contents of the newly addressed storage location SL–2 are transferred to the A register, as in the normal entry cycle. However, as in the first subcycle of the program entry cycle the previous program data is not returned to memory M but instead is replaced by data from the $A_d$ section of the A register.

Thus, it is noted that in the prior art program entry cycle the key-entered program data is not transferred to the program memory $M_p$. This is because, as shown in FIG. 1*b*, the data transferred to the program memory $M_p$ is the data previously contained in the working data section $M_d$ of the memory and is not the data which was just keyed in. The new data was entered only into the working data section $M_d$ of the memory. Additionally, it can be seen that during the second subcycle of the program entry cycle the program data of the next succeeding storage location SL–2 is altered to conform with whatever data is stored in the corresponding working data section of the memory.

These two factors present difficulties in that in order to enter the new program data into the program memory $M_p$, the operator has to key-enter the desired program and then go back and initiate a second sequence of entry cycles to transfer the data into the program memory $M_p$. Also, when it is desired to alter only a portion of the old program memory $M_p$ the operator cannot avoid altering the program data in the storage location following the last storage location of the changed field. This means that in any program entry cycle where less than the full program is being altered the operator has to key-in the program character to be stored in the storage location following the last altered storage location even though that character is already properly in the program memory.

Figure 2:
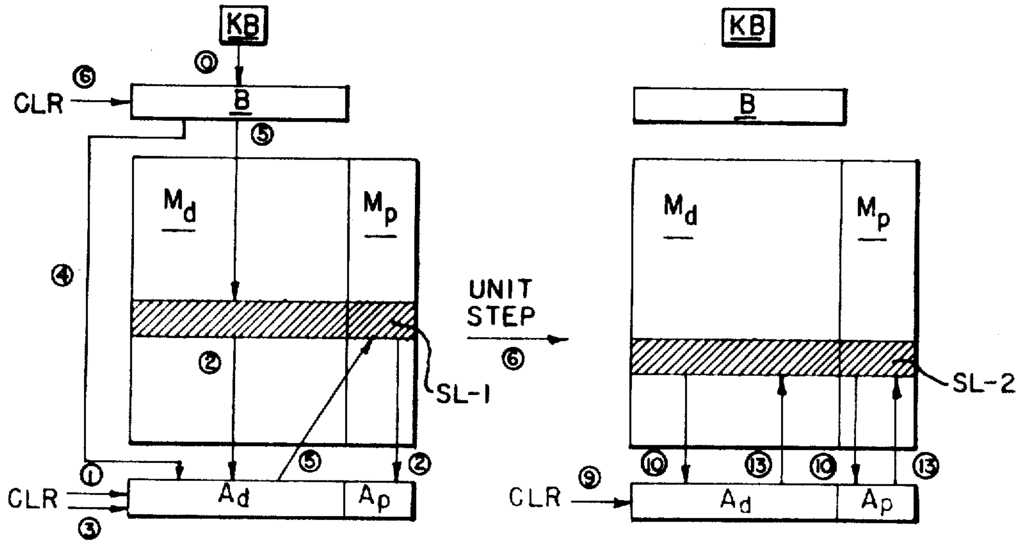
FIG 2 is a schematic diagram illustrating the execution of a program data entry cycle in accordance with the principles of the invention.

FIG. 2 schematically shows the manner in which a program data entry cycle is executed in accordance with the invention. The normal working data entry cycle as illustrated in FIG. 1*a* is not changed. In the program entry cycle the new character is transferred from the keyboard KB to the B register and immediately thereafter the A register is cleared and the working and program contents of the addressed memory location SL–1 are transferred to the working $A_d$ and program $A_p$ sections of the A register, respectively, as before. However, as soon as the A register is loaded it is recleared and then the contents of the B register are transferred to the working data section $A_d$. Thereafter, the contents of the B register are transferred to the working memory $M_d$ and, concurrently therewith, the newly entered program data is shifted from the A register to the program memory $M_p$. Thereafter, the B register is cleared and a unit step is performed.

In the second subcycle the A register is cleared and thereafter the contents of the newly addressed storage location SL–2 are transferred in and out of the A register, just as in the second subcycle of the normal working data entry cycle.

Thus, it can readily be seen that the program data entry cycle illustrated in FIG. 2 enters the new program data into the program memory $M_p$ in a single cycle and the program data already stored in the next succeeding storage location SL–2 is undisturbed during the cycle. The difficulties inherent in the prior art system are thus completely eliminated.

Figure 3A:
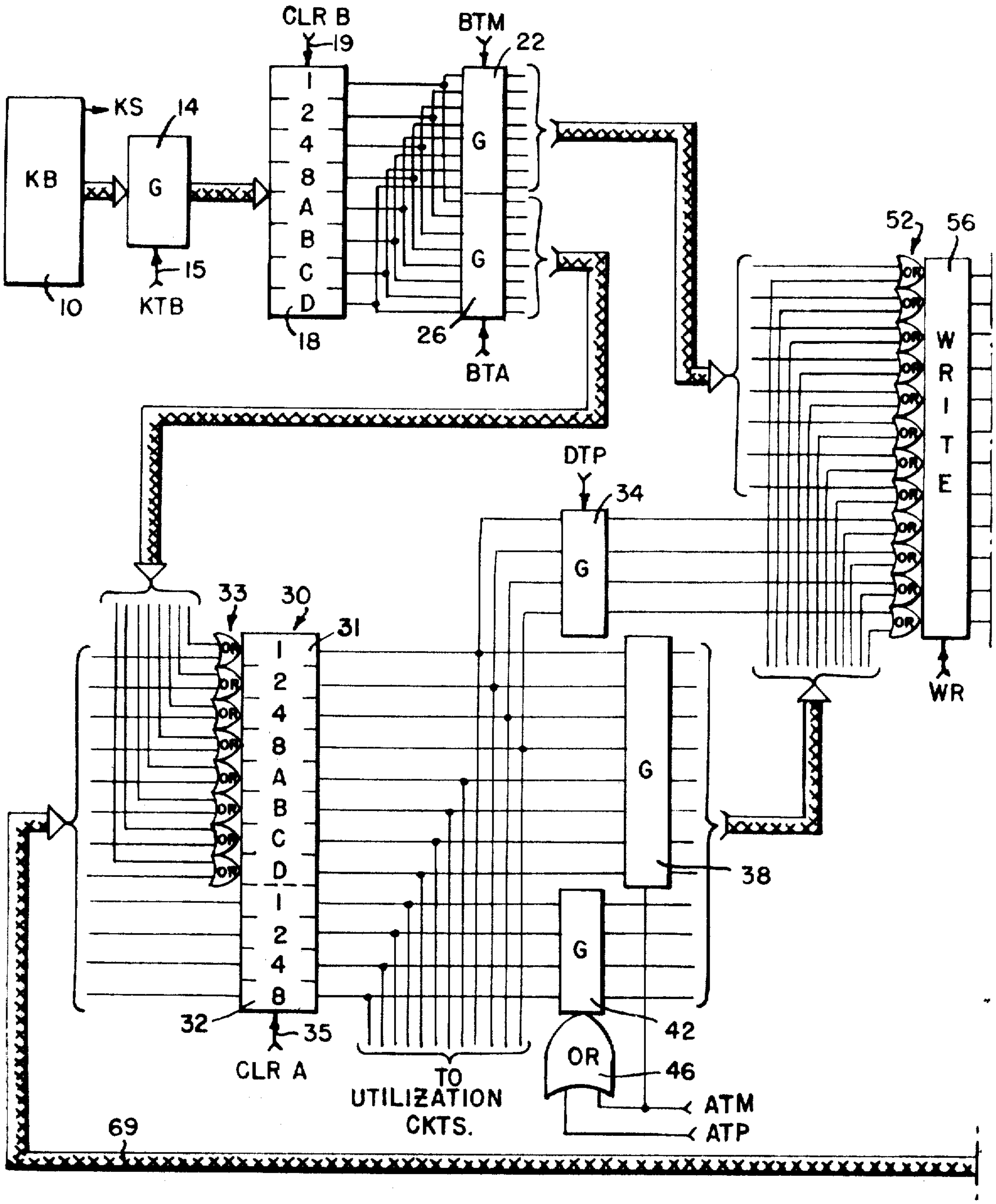
FIGS. 3*a* and 3*b*, when placed side by side, constitute a schematic circuit diagram of the memory loading system of the invention.
Figure 3B:
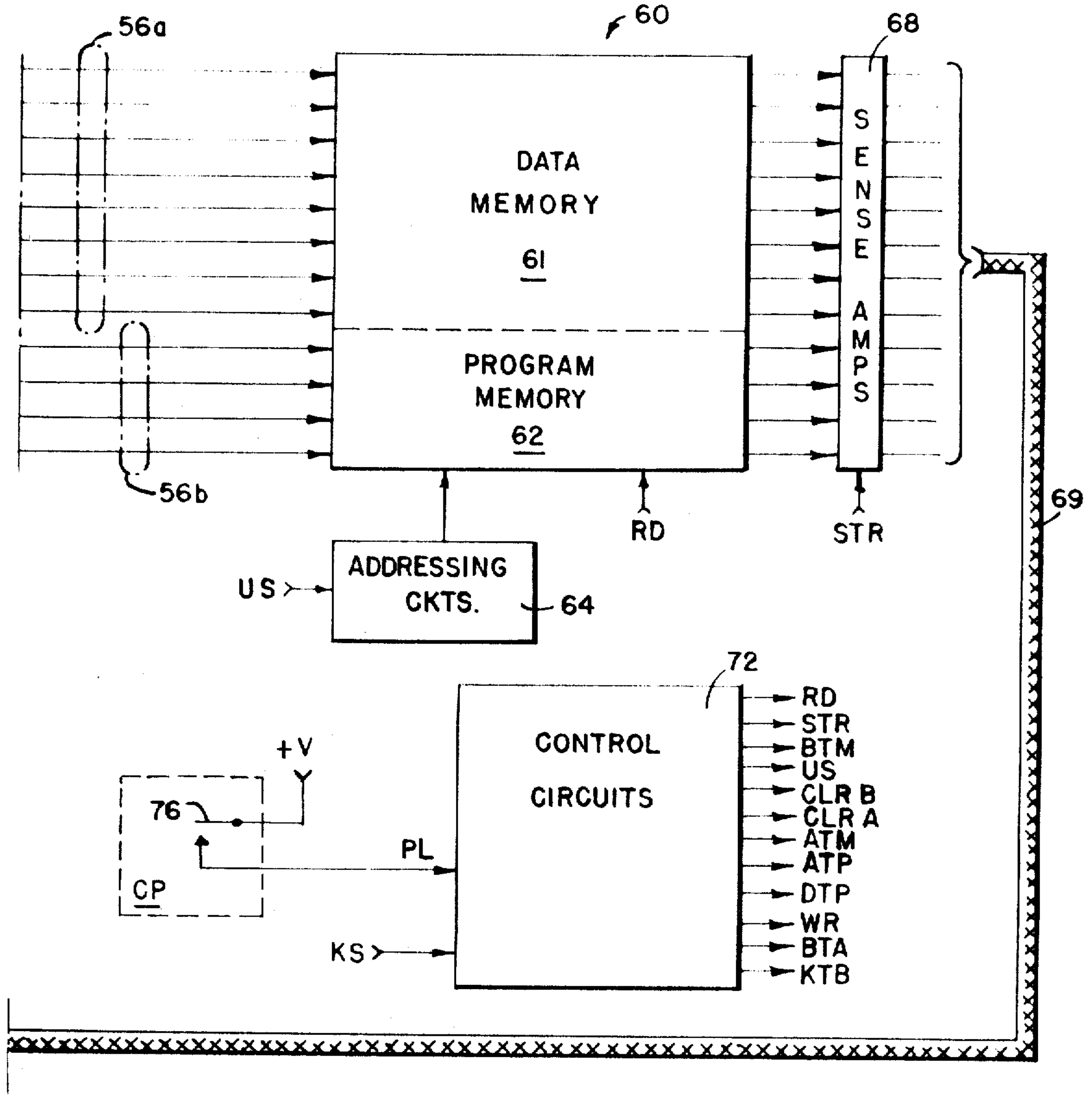

FIGS. 3*a* and 3*b* schematically illustrate a preferred form of memory loading system in accordance with the invention. A keyboard 10 is connected by a multiline cable to B register 18 via a gate circuit 14. The multiline cable transmits in parallel the bits of a full eight-bit data character. For the purposes of this description the bits of a data character are referred to as the 1, 2, 4, 8, A, B, C, and D bits. Gate circuit 14 is of conventional construction, including eight two-input AND circuits, each of which has one of its inputs connected to a different one of the data lines and has its other input connected to a common gate control line 15. Each data line transmits binary information in the form of either a one (represented by a high voltage level) or a zero (represented by a lower voltage level).

B register 18 is preferably constructed of eight conventional binary flip-flop circuits arranged to store the eight bits of data character. A clear line 19 is connected to all eight register positions and causes each position to be cleared to the zero state in response to a CLRB signal.

The eight output lines from the B register are gated to buffer memory 60 by a gate circuit 22 and to the A register 30 by a gate circuit 26. The A register is constructed in a manner identical to the B register except that it has 12 storage positions. Section 31 includes eight positions designated 1, 2, 4, 8, A, B, C, and D for storing a working data character transferred from either the B register 18 or from the buffer memory 60. The two sets of inputs to the section 31 are channeled through a set of OR circuits 33. The section 32 of the A register includes four storage positions for storing the 1, 2, 4 and 8 bits of a program data character. Inputs to the section 32 come only from the buffer memory 60. It is to be understood that the use of eight bits for working data characters and four bits for program data characters herein is illustrative only and in practice any suitable code format having any desired number of bits per character may be used. A CLRA signal presented on clear line 35 resets the A register.

The twelve output lines from the A register 30 are used for transmitting A register data both to the buffer memory 60 and to a set of utilization circuits (not shown) which employ the A register data for purposes not directly relevant to the present invention. As has been mentioned previously such circuits may be used to inspect the program character contained in section 32 of the register during the second subcycle of a data entry cycle to determine which, if any, automatic subroutines must be executed.

The output from the A register is transmitted back to the buffer memory 60 via a set of gate circuits, 34, 38 and 42. Gate 34 transmits the 1, 2, 4, and 8 bit data from section 31 of the register through a set of four OR circuits 52 to a write circuit 56 for entry into the program section 62 of the buffer memory 60. Gate 34 operates in response to a data-to-program (DTP) control signal transmitted from the control circuits 72.

Gate 38 operates in response to an A-to-memory (ATM) control signal to transmit the data contained in section 31 of the A register to write circuit 56 for entry thereby into the working data section 61 of the buffer memory. Gate 42 operates in response to either the ATM control signal or to an A-to-program (ATP) control signal to transmit the data contained in section 32 of the A register to the write circuit 56 for entry into the program section 62 of the buffer memory. An OR circuit 46 controls gate 42 from inputs on the ATM and ATP control lines.

Write circuit 56 is supplied with inputs from 12 OR circuits 52 and has 12 corresponding output lines for supplying data recording signals to the buffer memory. The eight drive lines 56*a* are used to present working data characters to section 61 of the memory and the four drive lines 56*b* are used to present program data characters to section 62 of the memory. The output lines 56*a* and 56*b* are activated in response to a write control signal WR. The lines 56*a*, when activated, supply to the memory whatever data is then being transmitted through either gate 22 or gate 38 and the lines 56*b*, when activated, present to the memory whatever data is then being transmitted by either gate 34 or gate 42.

As previously mentioned, there is one character storage location in the program section 62 of the memory 60 for each character storage location in the working data section 61. An addressing circuit 64 is provided for selecting storage locations in the memory one set at a time (a set consisting of one working character location in memory section 61 together with the corresponding program character location in section 62). The addressing circuit is controlled by unit step (US) control signals, each one of which advances the circuit 64 to the next memory location.

Memory 60 preferably employs conventional magnetic cores as storage elements. Binary data is stored in the memory by write currents supplied on the drive lines 56*a* and 56*b* which link the cores in such a manner as to cause a core to be magnetized in a first direction if the data to be stored therein is a binary one and to be magnetized in the opposite direction if the data to be stored therein is a binary zero. In accordance with the well-known principles of coincident current selection, the characters presented on lines 56*a* and 56*b* are stored in one set of core locations selected in accordance with the pattern of select currents on the addressing lines from circuit 64.

To read data out of the memory 60 a read (RD) signal causes the 12 cores of the addressed set of storage locations to switch to a predetermined reference state of magnetism. This causes 12 sense lines, one linking each core of the set, to present data readout signals representing the data which had been stored in the addressed location. These signals are transmitted to 12 sense amplifiers 68 and the outputs of these amplifiers are sampled at a predetermined time in response to a strobe (STR) signal. The readout data thus generated is transmitted back to the input of the A register 30 via multiline cable 69. This type of readout is referred to as destructive readout since the process of reading the information out of the cores erases the data therefrom.

The control circuits 72 issue the various control signals referred to throughout the above description. The signals are issued in either of two predetermined sequences, depending on whether the system is executing a working data entry cycle or a program data entry cycle. For purposes of the present description, it is assumed that so long as switch 76 on the control panel CP of the data recorder is open the system will operate in the normal working data entry mode but when switch 76 is closed under operator control it transmits a control signal PL to the circuits 72 causing the system to operate in the program data entry mode. In either mode of operation the presentation of a key sprocket (KS) signal by the keyboard 10 to the control circuits 72 causes the latter to run through a single cycle sequence and then stop.

Figure 5:
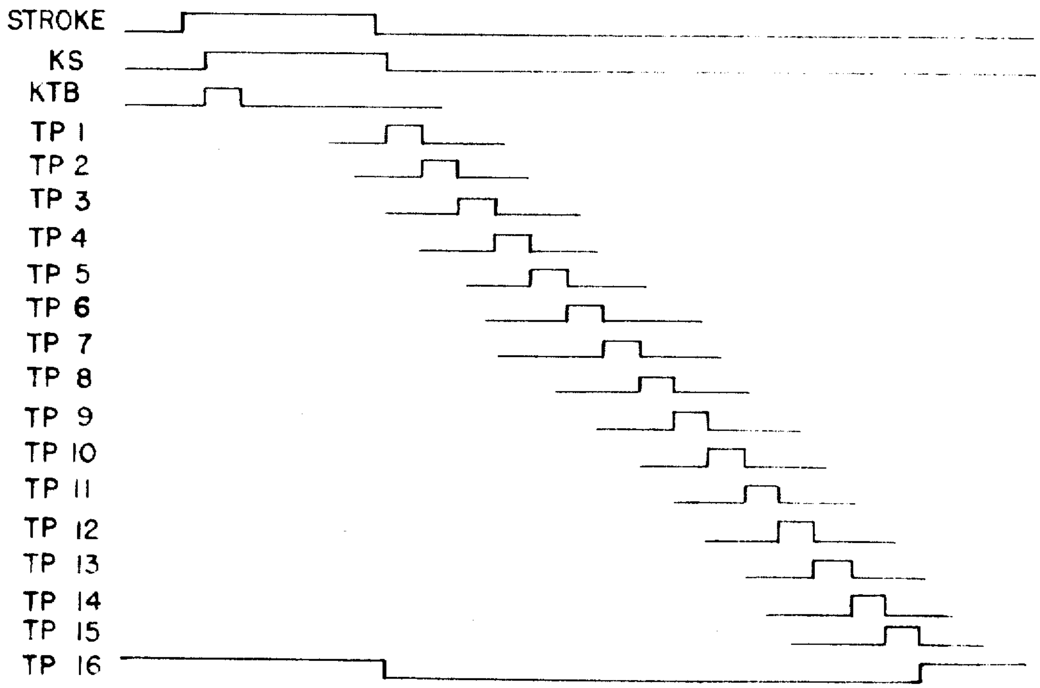
FIG. 5 is a waveform diagram showing the timing relationship of various control signals generated by the control circuits of FIG. 4.
Figure 4:
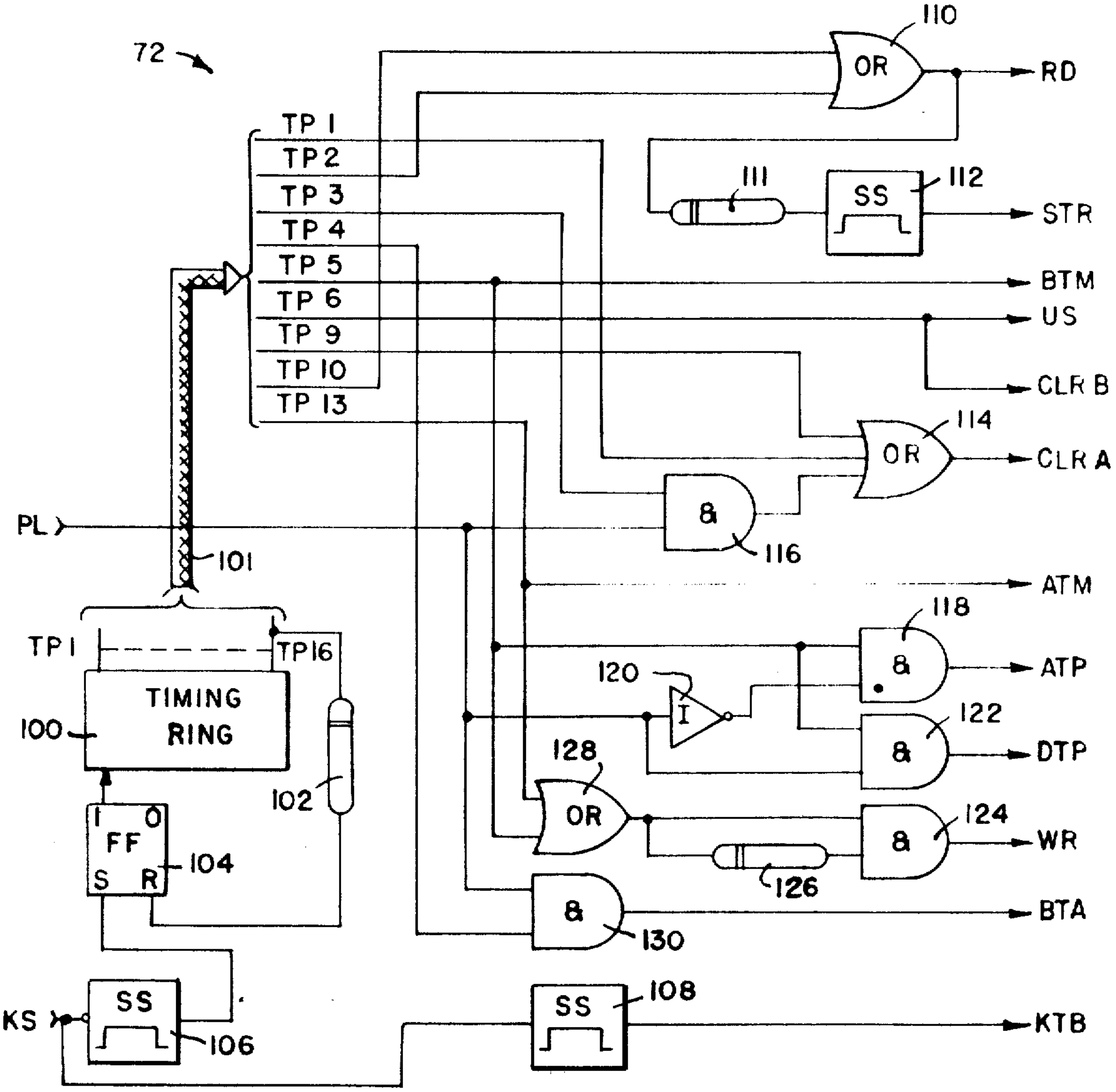
FIG. 4 is a schematic circuit diagram of the control circuits shown as a single schematic block in FIG. 3*b*.

FIG. 4 shows the control circuits in detail and FIG. 5 illustrates one cycle of operation thereof. A timing ring 100 (FIG. 4) supplies a sequence of sixteen timing pulses TP 1 through TP 16 on the 16 lines of a cable 101. The ring 100 is triggered into operation by an output signal from the set side of a flip-flop 104. Flip-flop 104 is set in response to an output from a single-shot multivibrator 106 which is activated by the trailing edge of the KS input signal from the keyboard.

To initiate a cycle the operator depresses a key, in the normal fashion, for a period identified as the STROKE signal (FIG. 5). The KS output signal from the keyboard is derived from the stroke period but is slightly offset in time with respect thereto for reasons not directly pertinent to the present invention. When KS goes positive, a single-shot 108 (FIG. 4) responds with an output pulse KTB. This is the pulse that opens gate 14 to enter the keyboard character into the B register. During this initial phase of the cycle, timing ring 100 remains in a static condition with its TP 16 output line high and the other 15 output lines low. When KS goes negative, single-shot 106 generates a pulse which sets flip-flop 104 and turns the timing ring on. TP 16 goes low while TP 1 simultaneously goes high. TP 1 stays high for a predetermined time and thereafter the ring steps through a sequence of 15 more output pulses TP 2 through TP 16 (FIG. 5). When TP 16 comes up at the end of the cycle a delay line 102, (FIG. 4), following a period of time approximately equal to the width of a TP pulse, passes the leading edge of TP 16 to the reset input of flip-flop 104. This turns the ring off and terminates the entry cycle.

An OR circuit 110 generates the RD signal each TP 2 and TP 10 time of the cycle, regardless of whether it is a working data or a program data entry cycle. Each time that RD is generated a single-shot multivibrator 112 generates the STR pulse to strobe the sensing amplifiers after a slight delay period established by a delay circuit 111.

The BTM signal which gates the output of the B register into the working data section of the buffer memory 60 is generated each TP 5 time, regardless of the nature of the entry cycle, and similarly the US and CLRB signals appear each TP 6 time. A CLRA pulse is generated, via an OR circuit 114, each TP 1 and TP 9 time, regardless of the nature of the cycle, and a further CLRA is generated at TP 3 time of program load cycles by the operation of an AND circuit 116. The latter circuit is conditioned to operate by the PL signal from the control panel program load switch 76. The output from AND 116 is fed through OR 114 to the CLRA output line.

The ATM signal is generated each TP 13 time of each cycle. The ATP signal which is used to gate the program contents of the A register back into the program section of the buffer memory, is generated by an AND 118 only during TP 5 of a working data entry cycle. During program loading cycles, an inverter circuit 120 deconditions AND 118 in response to the PL signal, inhibiting generation of ATP. On the other hand, the DTP signal, which is used to gate the 1, 2, 4, and 8 bits from the working data section of the A register to the program data section of the buffer memory, is generated by an AND circuit 122 only during TP 5 of a program load cycle. This is done by gating AND 122 with PL.

WR signals are generated each TP 5 and TP 13 time of each cycle. At each of these times an OR circuit 128 activates an AND circuit 124 to generate WR. A delay circuit 126 is provided to delay WR for a slight period of time to allow the A register output gates to completely settle before the buffer memory drive lines are activated.

The BTA signal, which gates the output of the B register into the working data section of the A register, is generated by an AND circuit 130 which has its inputs connected to the TP 4 output line from the timing ring and to the PL input line. BTA thus occurs only during TP 4 of a program data entry cycle.

OPERATION

With reference to FIGS. 3*a* and 3*b*, the operation of the data loading system of the invention is hereinafter described. In a working data entry cycle, depression of a data key on keyboard 10 causes the transmission of a KS signal from the keyboard to the control circuits, initiating the cycle. A KTB signal thereafter opens gate 14 and loads the B register 18 with the data character just keyed. Thereafter, the fixed timing cycle begins and at TP 1 CLRA appears on line 35 to clear the A register. Next, at TP 2, RD and STR cause the working and program data contents of the buffer memory location then being addressed by the circuit 64 to be loaded into the A register via cable 69. At TP 5 BTM goes positive, opening gate 22 and causing the contents of the B register to be presented to the write circuit 56. At the same time ATP occurs to open gate 42 to present the data from section 32 of the A register to the write circuit. Immediately thereafter WR comes up and causes the data from the B register and section 32 of the A register to be entered into the working and program data sections of the buffer memory. At TP 6 a US signal is fed to the addressing circuits 64 and the latter step to the next storage location in the memory. At TP 9 CLRA again goes positive to clear the A register. Next, at TP 10, the RD and STR signals are generated to read the contents of the newly addressed storage location out of the buffer memory and into the A register. Thereafter, at TP 13 an ATM signal opens both gates 38 and 42 and the WR signal is presented to write circuit 56, entering the full contents of the A register back into the buffer memory.

As can be seen from FIG. 1*a*, the above-described working data entry cycle of the system of the invention performs exactly the same functional operations as the system of the prior art.

In a program data entry cycle, the system operates as follows: KS initiates the cycle upon depression of a key and immediately thereafter KTB gates the program character into B register 18. At TP 1 CLRA clears the A register and at TP 2 the RD and STR signals gate the contents of the addressed storage location out of the buffer memory and into the A register. At TP 3 another CLRA signal again clears the A register. Next, at TP 4, BTA opens gate 26 to feed the contents of the B register into the working data section 31 of the A register. Thereafter, BTM opens gate 22 and DTP opens gate 34 to present the contents of the B register and the contents of the 1, 2, 4, and 8 positions of section 31 of the A register to the write circuits 56. WR then goes positive to enter that data into the working and program data sections of the buffer memory.

At TP 6 US occurs to step the addressing circuit 64 to the next storage location. Thereafter, CLRA occurs at TP 9 to clear the A register, RD and STR occur at TP 10 to read the contents of the new memory location into the A register and, at TP 13, ATM and WR occur to gate the data from the A register back into the buffer memory. This completes the cycle.

It will appreciated that various changes in the form and details of the above-described preferred embodiment may be effected by persons of ordinary skill without departing from the true spirit and scope of the invention.

We claim:

1. In a data recording system wherein the same input device loads both a buffer storage device with working data to be recorded and a program storage device with program control data, said buffer storage and program storage devices having interrelated storage locations, and wherein each working data storage cycle includes a first subcycle in which data is transferred from said input device to a selected location in said buffer storage device and a second subcycle in which the program control data stored in the program storage location related to the buffer location next succeeding said selected buffer location is read out for control purposes, the improvement comprising:
   - a storage register having a section for storing working data;
   - control means operable to indicate the presence of program control data at said input device;
   - first data transfer means responsive to said control means during said first subcycle for transferring data from said input device to the working data section of said storage register; and
   - second data transfer means, responsive to said control means subsequent to said last mentioned data transfer and during said first subcycle, for transferring data from said working data section of said storage register to the location in said program storage device related to said selected buffer storage location.

2. The data recording system set forth in claim 1 wherein said storage register comprises:
   - a multiposition binary storage register having a first plurality of positions for storing data transferred from said input device and having a second plurality of positions for storing data transferred from said program storage device.

3. The data recording system as recited in claim 1 wherein said storage register also has a section for storing program control data, and said system further comprises: third and fourth data transfer means operable during the same data storage cycle as said first and second data transfer means, said third data transfer means being adapted to transfer the data stored in the program storage location related to said next succeeding buffer storage location into said program control data section of said storage register, and said fourth data transfer means being adapted to transfer said last mentioned data back to said last-mentioned program storage location.

4. A data recording system comprising:
   - a keyboard data input device;
   - a data memory having a first section for storing working data and a second section for storing program data, the storage locations of said first and second sections being mutually interrelated;
   - a program data load switch;
   - a data transfer register;
   - first data transfer means, operable in response to an input from said keyboard device when said program data load switch is in an active condition, for transferring data from said keyboard device to a selected storage location in said first section of said data memory;

second data transfer means, also operable in response to said input from said keyboard when said program data load switch is in an active condition, for also transferring data from said keyboard device to said data transfer register; and third data transfer means for transferring said last mentioned data from said register to the storage location in said second section of said data memory related to said selected storage location.

5. The data recording system as recited in claim 4 wherein said third data transfer means transfers only a portion of the data in said register to said storage location in said second section of said data memory.

6. The data recording system as recited in claim 4 and further comprising:

control means operable following said last-mentioned transfer for transferring to said transfer register data from the working data and program data storage locations adjacent said selected storage locations; and second control means for thereafter returning said last-mentioned data from said working and program data storage locations to said working data and program data storage locations adjacent said selected storage locations.

7. The data recording system as recited in claim 6 wherein said transfer register comprises:

a multiposition binary storage register having a first plurality of positions for storing data transferred from said input device and having a second plurality of positions for storing data transferred from said program data storage section of said data memory.

8. A method of loading program control data into a data recorder having a data input device for loading both a buffer storage device with working data to be recorded and a program storage device with program control data, said buffer storage and program storage devices having interrelated storage locations, and a storage register having a section for storing working data and a section for storing program control data, the method comprising:

transferring said program control data from said input device to the working data section of said storage register;

also transferring said program control data from said input device to a selected location in said buffer storage device; and transferring said program control data from said working data section of said storage register to the location in said program storage device related to said selected buffer storage device location.

9. The method as recited in claim 8 an further comprising:

subsequently transferring the data from the location in said program storage device related to the next succeeding location in said buffer storage device into said program control data section of said storage register; and thereafter transferring said last-mentioned data back to said last-mentioned program storage device location.